(12) United States Patent
Li et al.

(10) Patent No.: US 11,463,187 B2
(45) Date of Patent: Oct. 4, 2022

(54) FAULT TOLERANT DESIGN FOR CLOCK-SYNCHRONIZATION SYSTEMS

(71) Applicant: Google LLC, Mountain View, CA (US)

(72) Inventors: Yuliang Li, Cambridge, MA (US); Gautam Kumar, Mountain View, CA (US); Nandita Dukkipati, Menlo Park, CA (US); Hassan Wassel, San Jose, CA (US); Prashant Chandra, San Jose, CA (US); Amin Vahdat, Los Altos, CA (US)

(73) Assignee: Google LLC, Mountain View, CA (US)

( * ) Notice: Subject to any disclaimer, the term of this patent is extended or adjusted under 35 U.S.C. 154(b) by 56 days.

(21) Appl. No.: 17/091,158

(22) Filed: Nov. 6, 2020

(65) Prior Publication Data

US 2021/0320736 A1    Oct. 14, 2021

Related U.S. Application Data

(60) Provisional application No. 63/009,512, filed on Apr. 14, 2020.

(51) Int. Cl.
*H04J 3/06* (2006.01)
*H04L 7/00* (2006.01)
*H04L 12/44* (2006.01)

(52) U.S. Cl.
CPC .......... *H04J 3/0641* (2013.01); *H04J 3/065* (2013.01); *H04L 7/0016* (2013.01); *H04L 12/44* (2013.01)

(58) Field of Classification Search
CPC ........ H04J 3/0641; H04J 3/065; H04J 3/0679; H04J 2203/0062; H04W 84/20;
(Continued)

(56) References Cited

U.S. PATENT DOCUMENTS

| 7,656,907 | B2 * | 2/2010 | Chang | ................... | H04J 3/0697 713/400 |
|---|---|---|---|---|---|
| 10,158,442 | B1 | 12/2018 | Volpe | | |

(Continued)

OTHER PUBLICATIONS

Extended European Search Report for European Patent Application No. 20211002.9 dated Jun. 1, 2021. 9 pages.
(Continued)

*Primary Examiner* — Jung Liu
(74) *Attorney, Agent, or Firm* — Lerner, David, Littenberg, Krumholz & Mentlik, LLP

(57) ABSTRACT

A system is provided for synchronizing clocks. The system includes a plurality of devices in a network, each device having a local clock. The system is configured to synchronize the local clocks according to a primary spanning tree, where the primary spanning tree has a plurality of nodes connected through a plurality of primary links, each node of the plurality of nodes representing a respective device of the plurality of devices. The system is also configured to compute a backup spanning tree before a failure is detected in the primary spanning tree, wherein the backup spanning tree includes one or more backup links that are different from the primary links. As such, upon detection of a failure in the primary spanning tree, the system reconfigures the plurality of devices such that clock synchronization is performed according to the backup spanning tree.

20 Claims, 11 Drawing Sheets

(58) Field of Classification Search
CPC ............ H04W 56/0015; H04W 56/001; G06F 11/1604; H04L 7/0016; H04L 12/44; H04L 1/242; H04L 1/244; H04L 12/26; H04L 12/2697; H04L 43/50; H04Q 1/20; H04Q 11/045

See application file for complete search history.

(56) References Cited

U.S. PATENT DOCUMENTS

| | | | |
|---|---|---|---|
| 10,284,318 B1 | 5/2019 | Choudhury et al. | |
| 2008/0025203 A1* | 1/2008 | Tallet | H04L 43/0811 370/216 |
| 2009/0290511 A1* | 11/2009 | Budampati | H04J 3/0641 370/254 |
| 2009/0290572 A1* | 11/2009 | Gonia | H04J 3/0641 370/350 |
| 2015/0121115 A1* | 4/2015 | Chandra | G06F 13/4022 713/400 |
| 2015/0229587 A1* | 8/2015 | Ma | H04L 49/254 370/419 |
| 2017/0126482 A1 | 5/2017 | Jayaraman et al. | |
| 2021/0377891 A1* | 12/2021 | Chen | H04W 56/001 |

OTHER PUBLICATIONS

Feng, Libo et al. "Scalable Dynamic Multi-Agent Practical Byzantine Fault-Tolerant Consensus in Permissioned Blockchain." Oct. 15, 2018. Applied Sciences 2018, 8(10). 21 pages. Retrieved from the Internet: <https://doi.org/10.3390/app8101919>.

Lu, Yao et al. "Backup Path with Energy Prediction based on Energy-Aware Spanning Tree in Wireless Sensor Networks." Oct. 2013. Proceedings—2013 International Conference on Cyber-Enabled Distributed Computing and Knowledge Discovery. DOI: 10.1109/CyberC.2013.73. pp. 392-397.

Cisco. "Understanding Rapid Spanning Tree Protocol (802.1w)." Aug. 1, 2017. 16 pages.

* cited by examiner

FAULT TOLERANT DESIGN FOR CLOCK-SYNCHRONIZATION SYSTEMS

CROSS-REFERENCE TO RELATED APPLICATIONS

The present application claims the benefit of the filing date of U.S. Provisional Patent Application No. 63/009,512 filed Apr. 14, 2020, the disclosure of which is hereby incorporated herein by reference.

BACKGROUND

Many aspects of a datacenter, including protocols for distributed systems and storages, network telemetry and management, require that a consistent time is kept among distributed components. However, temperature variations and aging may cause oscillators in local clocks of the distributed components to drift or change in rates, bit flips may also occur in the local clocks, etc. Thus, a datacenter may have a clock synchronization system to ensure that respective local clocks of the distributed components are synchronized within a time bound. A small time bound is desirable for many reasons. For example, transactions for a distributed database may wait a predetermined time bound before committing to ensure consistency, which means that a larger time bound may delay such transactions. As another example, roundtrip delays, rather than one-way delays, are typically measured for telemetry and congestion control because the typical time bound can be too large to measure accurate one-way delays. As still another example, the time bound may create difficulties when debugging using error logs generated by different devices.

A clock synchronization system may also fail for many reasons. As some examples, network devices such as switches and network interface cards (NICs) may fail due to bit flips or memory corruption, links between the devices may fail due to network issues. In case of failure or suspected failure, distributed components of a datacenter may assume a worst-case time bound, which may negatively impact the various example operations described above, including greater delays for commit transactions. When a failure is detected, the clock synchronization system may compute a backup plan that reconfigures the system to recover the synchronization. However, it may take a long time to compute the backup plan, causing disruption to the services provided by the datacenter. Further, byzantine failures may occur where one or more components are behaving in a manner such that the system cannot be certain whether the components have failed, causing devices and/or applications to continue to rely on erroneous timestamps.

BRIEF SUMMARY

The present disclosure provides for configuring, by one or more processors, a plurality of devices in a network for clock synchronization according to a primary spanning tree, wherein the primary spanning tree has a plurality of nodes connected through a plurality of primary links, each node of the plurality of nodes representing a respective device of the plurality of devices; computing, by the one or more processors, a backup spanning tree before a failure is detected in the primary spanning tree, wherein the backup spanning tree includes one or more backup links that are different from the primary links; and upon detection of a failure in the primary spanning tree, reconfiguring, by the one or more processors, the plurality of devices such that clock synchronization is performed according to the backup spanning tree.

The method may further comprise, upon detection of the failure in the primary spanning tree, computing a second backup spanning tree, wherein the second backup spanning tree includes one or more second backup links that are different from the backup links.

The method may further comprise periodically computing, by the one or more processors, additional backup spanning trees, wherein the additional backup spanning trees include one or more additional backup links that are different from the backup links.

The primary spanning tree may include a primary root node and the backup spanning tree includes a backup root node that is a child of the primary root node, and wherein the primary links connect all non-root nodes of the primary spanning tree to the primary root node and the backup links connect all non-root nodes of the backup spanning tree to the backup root node.

The primary spanning trees may comprise one or more primary subtrees, and the primary links do not form any loops within any of the primary subtree.

In the backup spanning tree, a backup parent node of any given node is not an ancestor of the given node.

The backup spanning tree may include a loop connecting the backup root node to a plurality of nodes each having a backup subtree. The method may further comprise configuring, by the one or more processors, the backup root node to receive synchronization messages from the primary root node through the loop when synchronization messages are not received directly from the primary root for a first predetermined time period. The method may further comprise detecting, by the one or more processors based on not receiving synchronization messages through the loop for a second predetermined time period, a failure in the primary root node; configuring, by the one or more processors, the backup root node to replace the primary root node.

The method may further comprise receiving, at a given node, a first synchronization message from a primary parent node of the given node; detecting, based on a mismatch between a first timestamp in the first synchronization message and a first local clock value of the given node meeting a predetermined threshold, a byzantine failure; after being reconfigured according to the backup spanning tree, receiving, at the given node, a second synchronization message from a backup parent node of the given node; detecting, based on a mismatch between a second timestamp in the second synchronization message and a second local clock value of the given node meeting the predetermined threshold, that the byzantine failure occurred at the given node.

The method may further comprise receiving, at a given node, a first synchronization message from a primary parent node of the given node; detecting, based on a mismatch between a first timestamp in the first synchronization message and a first local clock value of the given node meeting a predetermined threshold, a byzantine failure; after being reconfigured according to the backup spanning tree, receiving, at the given node, a second synchronization message from a backup parent node of the given node; and detecting, based on a mismatch between a second timestamp in the second synchronization message and a second local clock value of the given node not meeting the predetermined threshold, that the byzantine failure occurred at the primary parent node.

The method may further comprise providing timestamps from synchronized clocks to one or more applications; using the timestamps to order delivery of packets between the one or more applications.

The method may further comprise providing timestamps from synchronized clocks to at least one telemetry or congestion control applications for measuring one-way delay in the network.

The present disclosure further provides a system comprising one or more processors. The one or more processors are configured to: configure a plurality of devices in a network for clock synchronization according to a primary spanning tree, wherein the primary spanning tree has a plurality of nodes connected through a plurality of primary links, each node of the plurality of nodes representing a respective device of the plurality of devices; compute a backup spanning tree before a failure is detected in the primary spanning tree, wherein the backup spanning tree includes one or more backup links that are different from the primary links; and upon detection of a failure in the primary spanning tree, reconfigure the plurality of devices such that clock synchronization is performed according to the backup spanning tree.

The system may further comprise the plurality of devices, the plurality of devices each having a respective local clock.

The system may further comprise a plurality of computing devices in a distributed computing environment, each of the plurality of computing devices having a respective network interface card (NIC). The plurality of computing devices may be configured to provide one or more cloud services, and the NICs are configured to provide direct access of timestamps from the synchronized clocks to the one or more cloud services.

The primary spanning tree may include a primary root node and the backup spanning tree includes a backup root node that is a child of the primary root node, and wherein the primary links connect all non-root nodes of the primary spanning tree to the primary root node and the backup links connect all non-root nodes of the backup spanning tree to the backup root node. The backup spanning tree may include a loop connecting the backup root node to a plurality of nodes each having a backup subtree.

The present disclosure still further provides a non-transitory computer-readable storage medium storing instructions executable by one or more processors for performing a method, comprising: configuring a plurality of devices in a network for clock synchronization according to a primary spanning tree, wherein the primary spanning tree has a plurality of nodes connected through a plurality of primary links, each node of the plurality of nodes representing a respective device of the plurality of devices; computing a backup spanning tree before a failure is detected in the primary spanning tree, wherein the backup spanning tree includes one or more backup links that are different from the primary links; and upon detection of a failure in the primary spanning tree, reconfiguring the plurality of devices such that clock synchronization is performed according to the backup spanning tree.

DETAILED DESCRIPTION

The technology generally relates to a fault-tolerant clock synchronization system. In this regard, a system may be configured to synchronize local clocks of a plurality of devices in a network according to a primary spanning tree. For instance, the devices may be switches of network interface cards (NICs). The primary spanning tree has a plurality of nodes connected through a plurality of primary links, where each node of the primary spanning tree represents a respective device of the plurality of devices. The system is further configured to compute at least one backup spanning tree before any failure is detected in the primary spanning tree, wherein the backup spanning tree includes one or more backup links that are different from the primary links. Upon detection of a failure, the system may reconfigure the plurality of devices such that clock synchronization may be performed according to the backup spanning tree.

Figure 1:
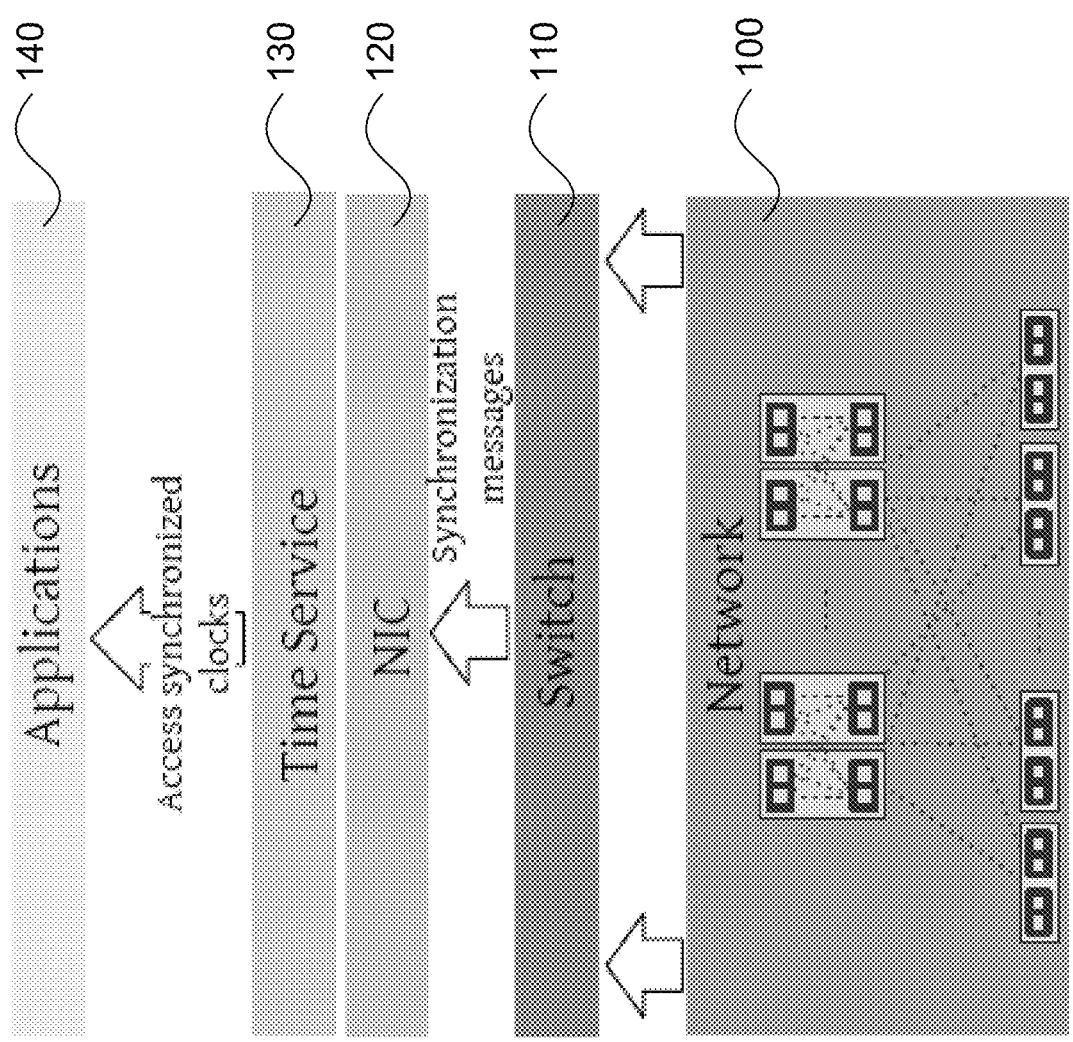
FIG. 1 shows an example datacenter in accordance with aspects of the disclosure.

FIG. 1 is a block diagram of an example system in which clock synchronization may be performed. As shown, a datacenter 100 may include a plurality of distributed computing devices connected over a network. For instance, the plurality of distributed computing devices may be providing one or more services over a cloud, such as storing data for a distributed database, running workloads for applications, hosting virtual machines or hypervisors, etc. A plurality of switches 110 may be provided in the datacenter 100 for routing packets between the distributed computing devices. The plurality of computing devices may each have a network interface card (NIC) 120 for connecting to the network and for sending packets to and receiving packets from the switches 110. The switches 110 and/or the NICs 120 may be hardware devices, alternatively, some or all of the switches 110 and/or the NICs 120 may be software-implemented virtual switches or virtual NICs.

Each of the switches 110 and each of the NICs 120 may have a respective local clock. Each local clock may be driven by an oscillator, which may be of any appropriate type, such as crystal oscillators. Each local clock may keep time values by incrementing clock_val with inc_step at every tick of the oscillator. The oscillator, however, may have rate variations and/or drifts induced by any of a number of factors, such as temperature, aging, etc. In this regard, frequency-stability of an oscillator may indicate the variation in the output frequency inc_step of the oscillator, expressed as a ppm value. For example, 100 ppm may indicate that an upper bound drift of 100 µs may occur over an interval of 1 s. To ensure a consistent time is kept among the devices despite such variations, the switches 110 and the NICs 120 may synchronize their respective local clocks by exchanging synchronization messages over the network.

A time service 130 may be provided by the datacenter 100, which may allow applications 140 and/or other services provided by the datacenter 100 to access the synchronized time. For example, the time service 130 may be provided as an API. Alternatively or additionally, the NICs 120 may provide their timestamps for direct access by the applications 140. For instance, a networking stack may provide an op-stream interface to the applications 140 and export the timestamps of the NICs 120, which may prevent out-of-order delivery of packets to the applications. As another example, telemetry and/or congestion control applications may directly rely on the timestamps of the NICs 120 to measure one-way delays, instead of roundtrip delays. However, as mentioned above, accurate one-day delays would require that the time bound for clock synchronization to remain small.

Figure 2:
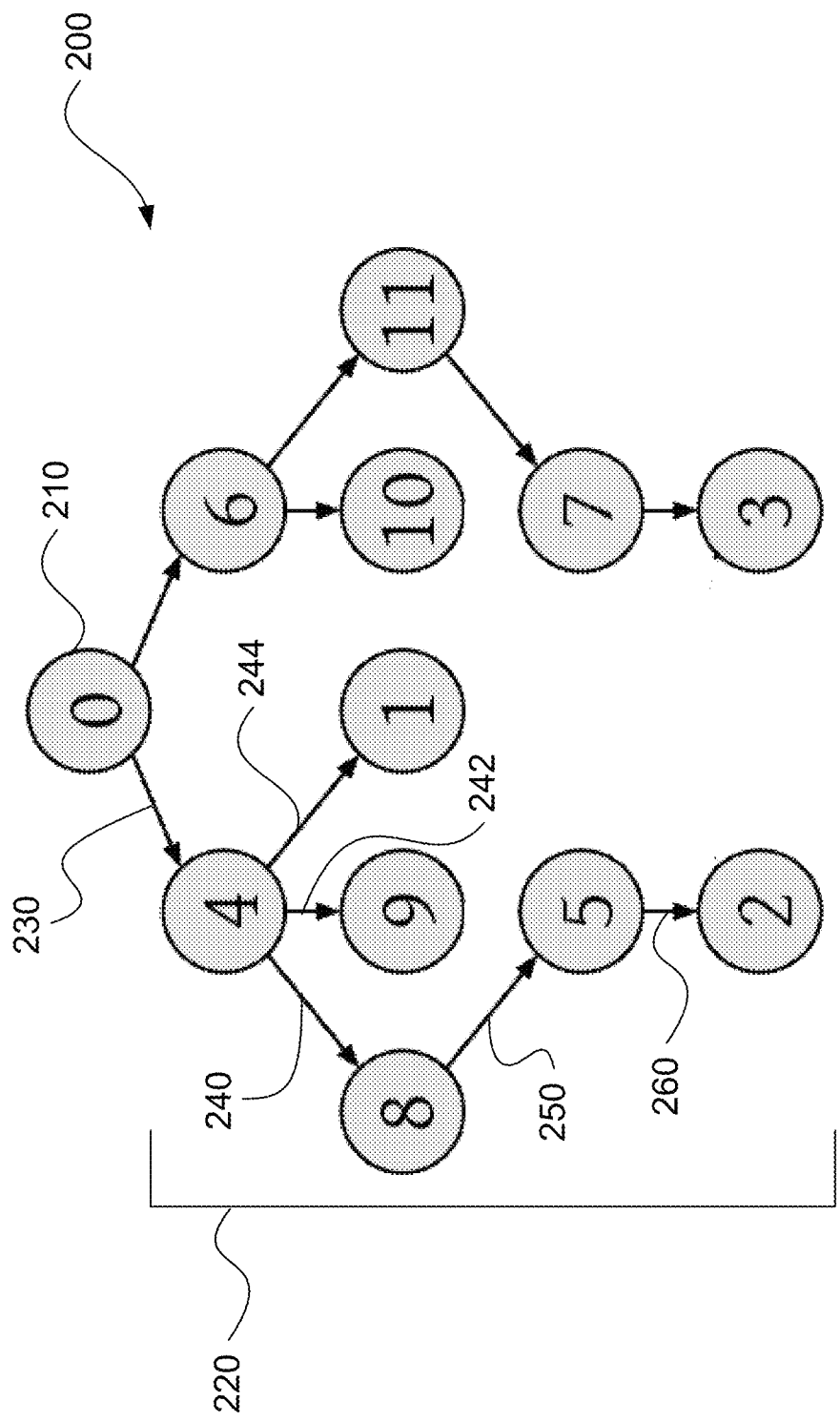
FIG. 2 shows an example spanning tree for clock synchronization in accordance with aspects of the disclosure.

To ensure a small time bound, clock synchronization in the datacenter 100 may be performed according to a spanning tree, further, backup spanning trees may be pre-computed to ensure quick failure handling. FIG. 2 is a block diagram of an example spanning tree 200. The spanning tree 200 is shown with 12 nodes labeled 0 to 11, although in practical systems any number of nodes may be in a spanning tree. Each node may be a device participating in clock synchronization. For example, each node may be one of the switches 110 or one of the NICs 120 in the datacenter 100.

A spanning tree may have a root node, which may be connected to nodes that descend from the root node, such as children, grandchildren, etc. Thus as shown in FIG. 2, node 0 is the root node 210 for the spanning tree 200, nodes 1-11 are non-root nodes 220. In some instances, the root node may be the device within the network having a master clock that is more reliable or accurate than other local clocks in the network. Two neighboring nodes, such as a parent node and its child node, may be connected by a link. For example, parent node 0 is connected to child node 4 by link 230. A path including one or more links may connect multiple nodes in a spanning tree. For example, nodes 0, 4, 8, 5, and 2 are connected along a path including links 230, 240, 250, 260. Thus in the spanning tree 200, each node may have at least one ancestor node or descendent node. For example, all the non-root nodes 1-11 are descendants of root node 0, and root node 0 is the ancestor of all the non-root nodes 1-11. Node 5 has only one descendant node 2, and 3 ancestor nodes 8, 4, and 0. Node 2 has 4 ancestor nodes 5, 8, 4, 0, but no descendant node. Further, the spanning tree 200 may be considered as comprising multiple subtrees, where the subtrees may start at any level below the root node. For example, nodes 4, 8, 5, 2, 9, 1 may be considered a subtree, nodes 6, 10, 11, 7, 3 may be considered a subtree, nodes 8, 5, 2 may be considered a subtree, node 9 alone may be considered a subtree, etc.

Clock synchronization may be performed by propagating synchronization messages through the spanning tree 200. For instance as shown in FIG. 2, the synchronization messages may be propagating from ancestor to descendant nodes through the various links as indicated by the arrows. To do so, a synchronization message may be timestamped with clock_val at egress time. When the message is received, the recipient may correct its local clock, for example by adding an offset to the clock_val, or adjusting the inc_step. Thus as an example, root node 0 may send a first synchronization message through link 230 to node 4 with a timestamp from its local clock; node 4 may synchronize its own local clock according to the first synchronization message and then send a second synchronization message through link 240 to node 8; node 8 may synchronize its local clock according to the second synchronization message and send a third synchronization message through link 250 to node 5; node 5 may synchronize its local clock according to the third synchronization message and send a fourth synchronization message through link 260 to node 2; node 2 may then synchronize its local clock according to the fourth synchronization message. In this manner, all the non-root nodes in the spanning tree 200 may synchronize their local clocks to the clock of root node 210.

The synchronization messages may be sent at a predetermined frequency to ensure frequent correction of local clocks. The synchronization may be affected by propagation transmission delay and queuing delay. However, in instances where timestamps are provided after queuing, synchronization is not affected by queuing delay, only by the transmission delay.

In addition to these delays, failures in the spanning tree 200 may cause more disruption. For example, the link between nodes 0 and 4 may be broken due to network or hardware issues. As another example, the device at node 4 may be failing or its local clock may be failing. As still another example, node 4 may be failing in a byzantine way such that nodes 8, 9, and 1 may not be sure whether node 4 is failing, and may come to different conclusions, which may result in dramatically different time values being kept by nodes 8, 9 and 1. To address failure detection and handling issues, the clock synchronization system may be provided with various fault-tolerant features as described below with reference to FIGS. 3-10.

Figure 3:
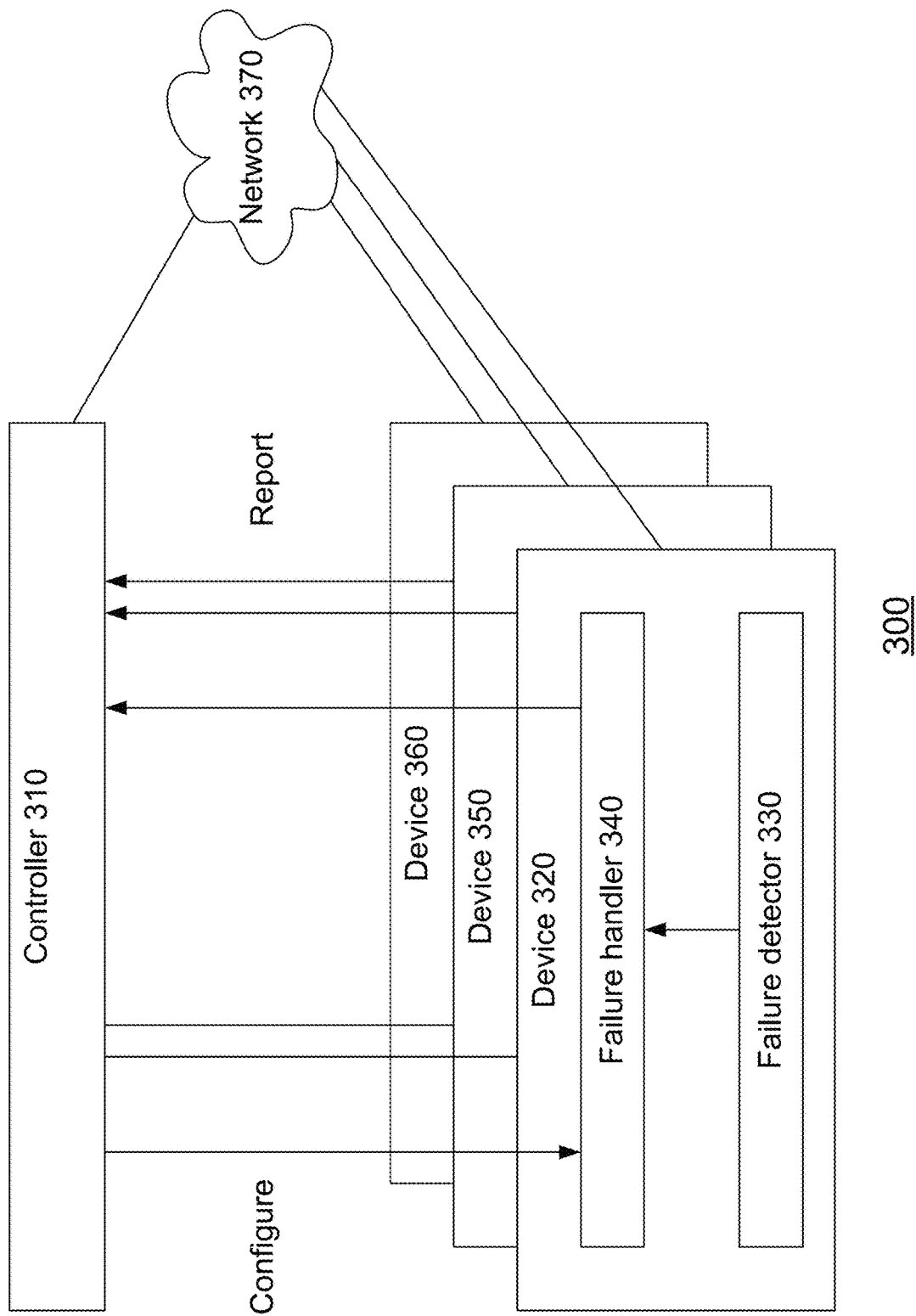
FIG. 3 shows an example clock synchronization system in accordance with aspects of the disclosure.

FIG. 3 is a block diagram of an example fault-tolerant clock synchronization system 300. In the clock synchronization system 300, one or more controllers may be provided for computing an initial primary spanning tree as well as pre-computing backup spanning trees in case of failure in the primary spanning tree, while individual devices participating in the clock synchronization may be configured to detect failures in the primary spanning tree. For instance as shown, a controller 310 is in communication with a plurality of devices 320, 350, 360, which may be switches and/or NICs, in a datacenter. Although only a few devices 320, 350, 360 are shown, in practical examples the system may include any of a number of devices.

Figure 9A:
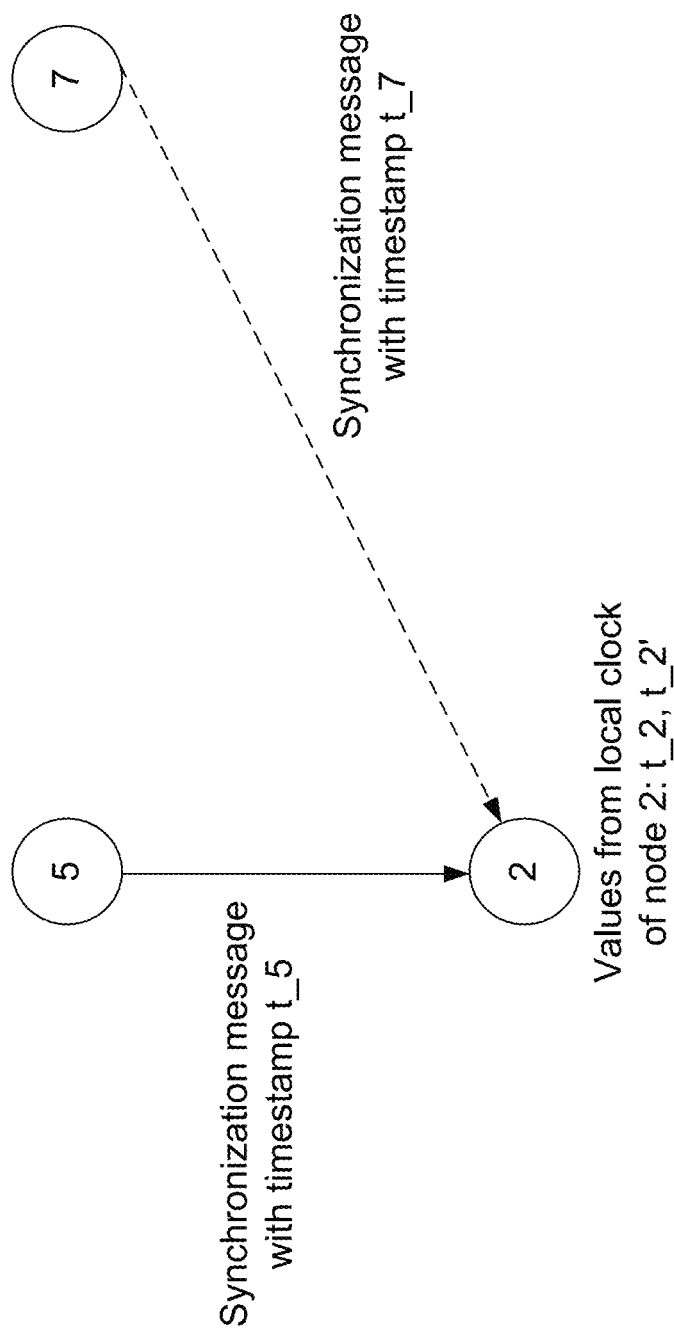
FIGS. 9A and 9B show example detections of byzantine failures in accordance with aspects of the disclosure.
Figure 9B:
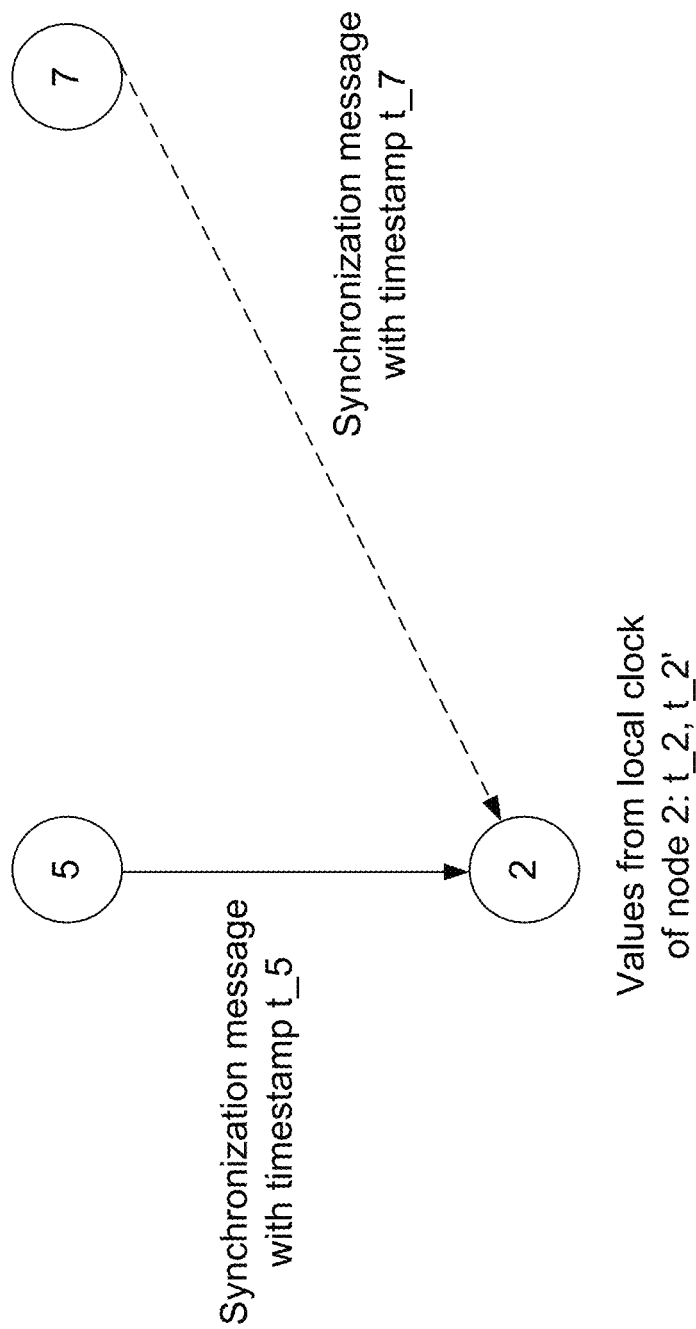

The controller 310 may initially configure the devices 320, 350, 360 according to a primary spanning tree. For example, the spanning tree 200 of FIG. 2 may be such a primary spanning tree. Before any failure occurs in the primary spanning tree, the controller 310 may also pre-compute one or more backup plans, such as one or more backup spanning trees. For example, any of the spanning trees 400, 500, 600, 700 shown in FIGS. 4-7 may be such backup spanning trees. Later during operation, the controller 310 may receive reports of failure detections from devices 320, 350, 360. For instance, each device, such as device 320, may include a failure detector that triggers a failure handler, such as failure detector 330 and failure handler 340 shown, the failure handler 340 may be in communication with the controller 310 and reports the detected failures. Further in this regard, FIG. 6 illustrates detection of a root node failure, and FIGS. 9A-9B illustrate detection of a byzantine failure in the primary spanning tree. In response to the detected failure, the controller 310 may then reconfigure one or more of the devices 320, 350, 360 according to one or more of the backup plans, such as reconfiguring the devices 320, 350, 360 according to a backup spanning tree.

The controller 310 may be hardware based or may be software defined. For instance, the controller 310 may be a software running on one or more computing devices containing one or more processors, memory, and other components typically present in general purpose computing devices. For example, the controller 310 may be one or more software instances running on one or more computing devices in the datacenter 100 of FIG. 1. The one or more processors can be dedicated components such as an application specific integrated circuit ("ASIC"), which may be customized or off-the-shelf, or any other conventional processors, such as commercially available microprocessors, CPUs, etc. Although not necessary, one or more of the processors may include specialized hardware components to perform specific computing processes.

Memory of the computing devices can be of any non-transitory type capable of storing information accessible by the processor, such as a hard-drive, memory card, ROM, RAM, DVD, CD-ROM, write-capable, and read-only memories. Memory of the computing devices can store information accessible by the rack processors, including data and instructions. For instance, memory of the computing devices can store instructions that can be executed by the processors. The memory of the computing devices can also include data that can be retrieved, manipulated, and/or stored by the processors.

The instructions can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance.

The data can have any of a number of structures. For example, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

Although not shown, the computing devices may optionally include other components typically present in general purpose computer devices. For example, the computing devices may include output devices, such as displays, speakers, haptics, etc. The computing devices may also include user input devices, such as a mouse, keyboard, touch-screen, microphones, sensors, etc.

Each of the devices 320, 350, 360 may contain one or more processors, memories, and other components typically present in general purpose computing devices as described above. For instance, the devices 320, 350, 360 may be part of a cloud computing system in the datacenter 100 of FIG. 1. As such, the devices 320, 350, 360 may each be configured to route packets for one or more cloud services. Examples of cloud services may include storing shards or replicas of data for a cloud database, running workloads for one or more applications, hosting virtual machines or hypervisors, etc.

The computing devices running the controller 310 and devices 320, 350, 360 can be at different nodes of a network, such as network 370, and capable of directly and indirectly communicating with other nodes of the network. The network 370 and intervening nodes described herein can be interconnected using various protocols and systems, such that the network can be part of the Internet, World Wide Web, specific intranets, wide area networks, or local networks. The network can utilize standard communication protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Although not shown, the system may further include one or more storage systems, which can be of any type of computerized storage capable of storing information accessible by one or more of the computing devices running the controller 310 and/or devices 320, 350, 360, such as a hard-drive, memory card, ROM, RAM, DVD, CD-ROM, write-capable, and read-only memories. In addition, the storage system may include a distributed storage system where data is stored on a plurality of different storage devices which may be physically located at the same or different geographic locations. The storage system may be connected to various computing devices via a network, and/or may be directly connected to any of computing devices running the controller 310 and/or devices 320, 350, 360.

The computing devices running the controller 310 and/or devices 320, 350, 360, and their respective processors, memories, and other elements may each comprise multiple processors, computers, computing devices, or memories that may or may not be stored within the same physical housing. For example, the memory of the computing devices can be a hard drive or other storage media located in housings different from that of the computing devices. Accordingly, references to a processor, computer, computing device, or memory will be understood to include references to a collection of processors, computers, computing devices, or memories that may or may not operate in parallel. For example, the computing devices may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

As described above, the controller 310 may compute a primary spanning tree according to which clock synchronization may be performed, as well as one or more backup spanning trees in case if the primary spanning tree fails. In this regard, the backup spanning tree may be computed for a particular type of failure, such as for a link failure shown in FIG. 4, for a non-root node failure shown in FIG. 5, or for a root node failure shown in FIG. 6. Alternatively, the backup spanning tree may be computed as a "generic" replacement in response to multiple types of failures, such as the examples shown in FIG. 7. In some instances, multiple backup spanning trees may be pre-computed, which may then be selected depending on the failure detected in the primary spanning tree. The controller 310 may configure and reconfigure the devices according to these spanning trees by sending the configurations to the failure handlers of the devices, such as the failure handler 340 of device 320. The examples in FIGS. 4-7 are described with reference to FIG. 2, and as such, the spanning tree 200 of FIG. 2 will be referred to below as the primary spanning tree, its root node 210 as the primary root node, its links as the primary links, its paths as primary paths, etc.

Figure 4:
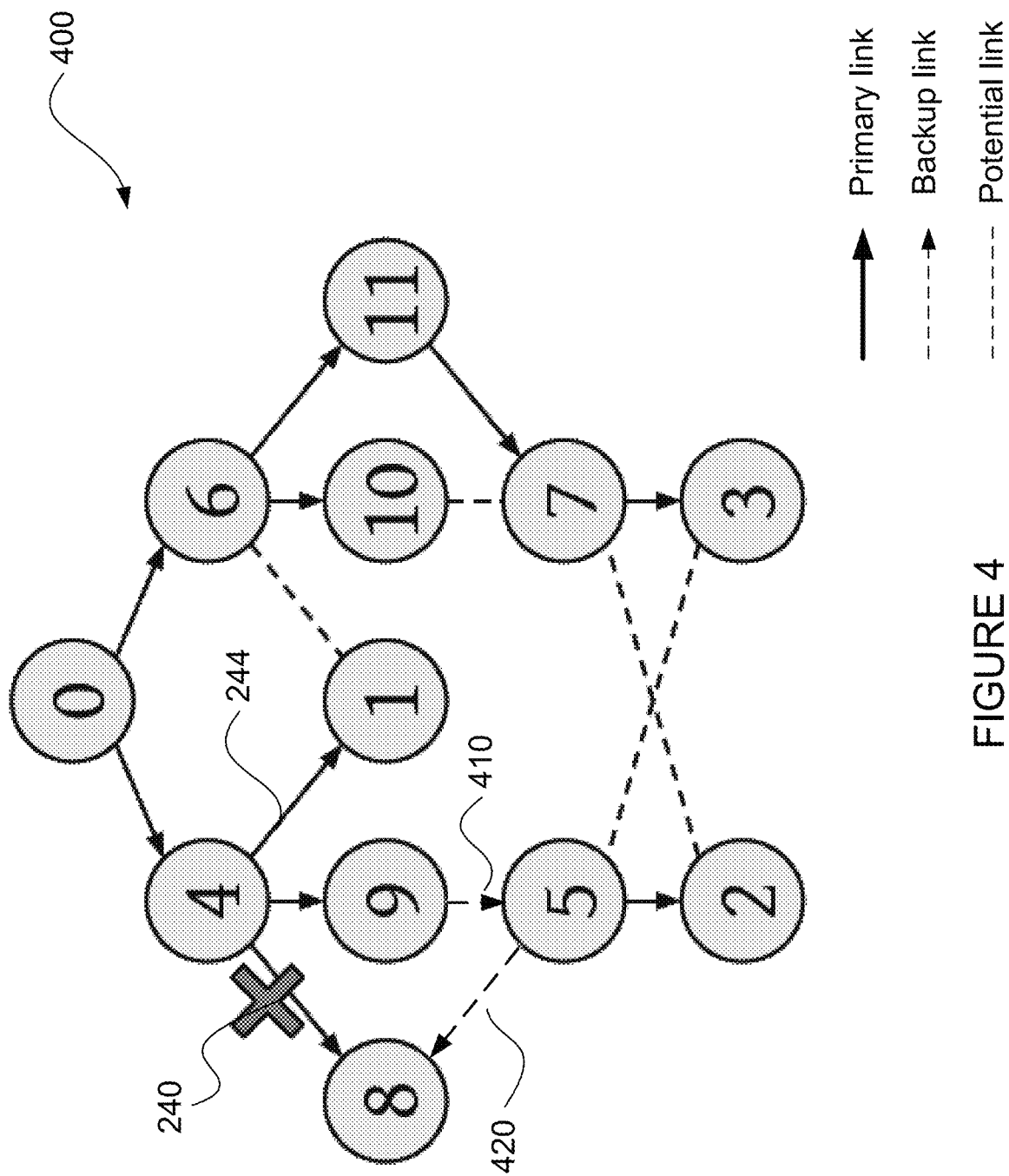
FIG. 4 shows an example backup spanning tree in response to a link failure in accordance with aspects of the disclosure.

FIG. 4 is a block diagram showing an example backup spanning tree 400 in response to a link failure. The spanning tree 200 of FIG. 2 is reproduced in FIG. 4, with the primary links shown as solid arrows. FIG. 4 further shows as dotted lines where potential links may be formed, but was not formed in the primary spanning tree 200. When a link fails in the primary spanning tree 200, such as primary link 240 shown, node 8 is no longer connected to root node 0 through node 4. Therefore node 8, as well as its descendants nodes 5 and 2, can no longer receive synchronization messages from node 4, and also are no longer connected to the root node 0. As such, at least one existing primary links need to be reconfigured and/or at least one new links need to be formed to reconnect nodes 5 and 2 to the root node 0.

Thus as shown, the backup spanning tree 400 includes both existing primary links of the primary spanning tree 200 that are reconfigured, as well as additional new links. For example, new backup link 410 is formed between nodes 9 and 5, which reconnects nodes 5 and 2 to the node 4 and root node 0. Further, to reconnect node 8 to root node 0, previously existing primary link 250, which pointed in the direction from node 8 to node 5 in the spanning tree 200, is reconfigured as backup link 420, which points in the direction from node 5 to node 8 in the backup spanning tree 400. In other words, node 9 is the backup parent node of node 5, and node 5 is the backup parent node of node 8.

However, it may be noted that, if a different primary link has failed in the primary spanning tree 200, then the backup spanning tree 400 may not be able to address that different link failure. For example, if primary link 244 fails instead of primary link 240, backup links 410 and 420 would not be able to reconnect node 1 to node 0, rather, a different backup link would be needed to a different backup parent. As such, the controller 310 may be configured to compute a backup parent node for each node in the primary spanning tree. For instance, the controller 310 may be configured to compute the backup parent nodes based on a first predetermined rule that, for each primary subtree, backup links within that primary subtree do not form a loop. For example referring to FIG. 4, the primary subtree including links to nodes 8, 5, 2 is cut off from the main tree due to the failed primary link 240, the backup link 420 does not form any loop within this primary subtree. Otherwise, the three nodes 8, 5, 2 would be synchronizing with each other, rather than according to the same root node 0 as the rest of the spanning tree.

Figure 5:
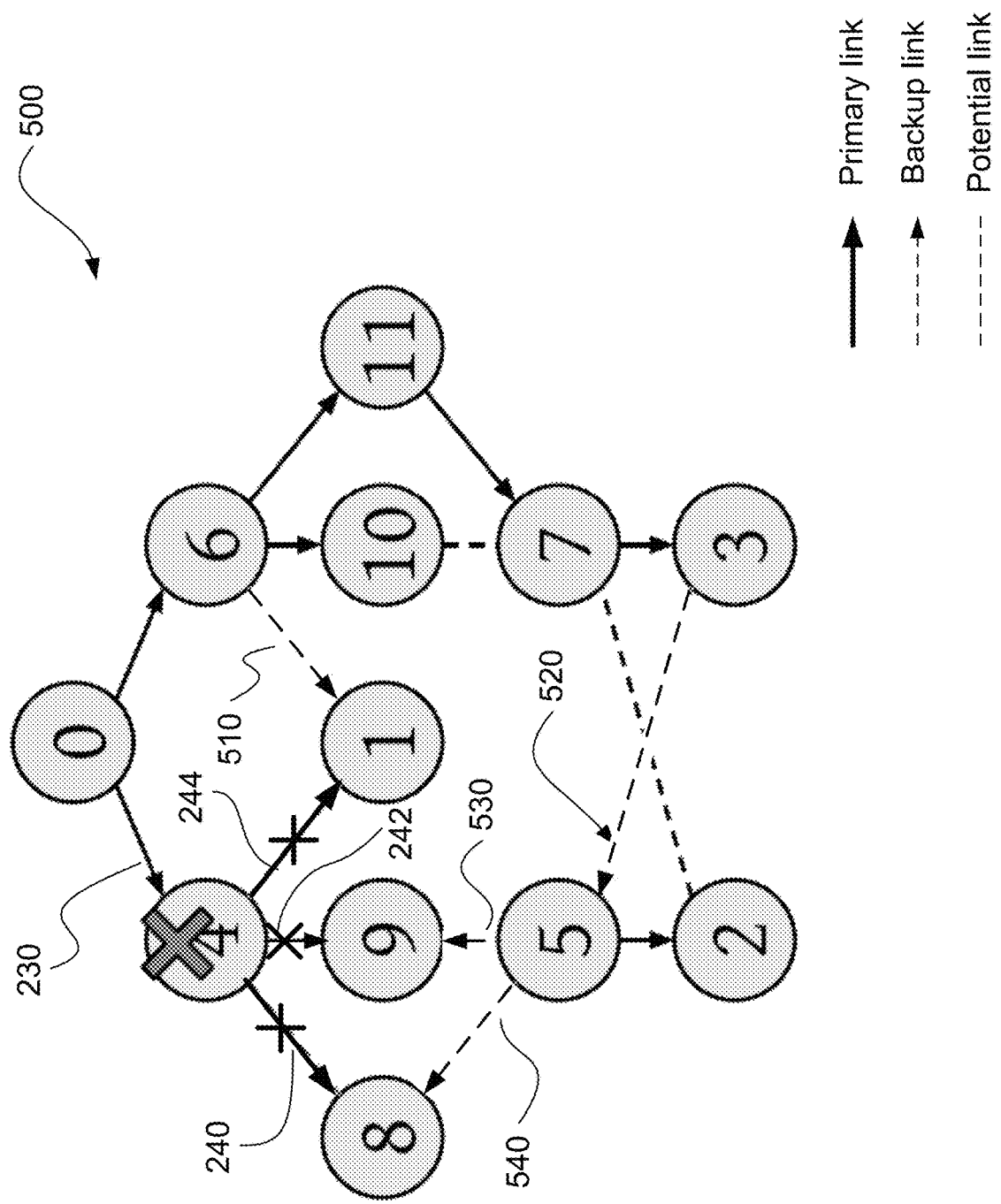
FIG. 5 shows an example backup spanning tree in response to a node failure in accordance with aspects of the disclosure.
Figure 6:
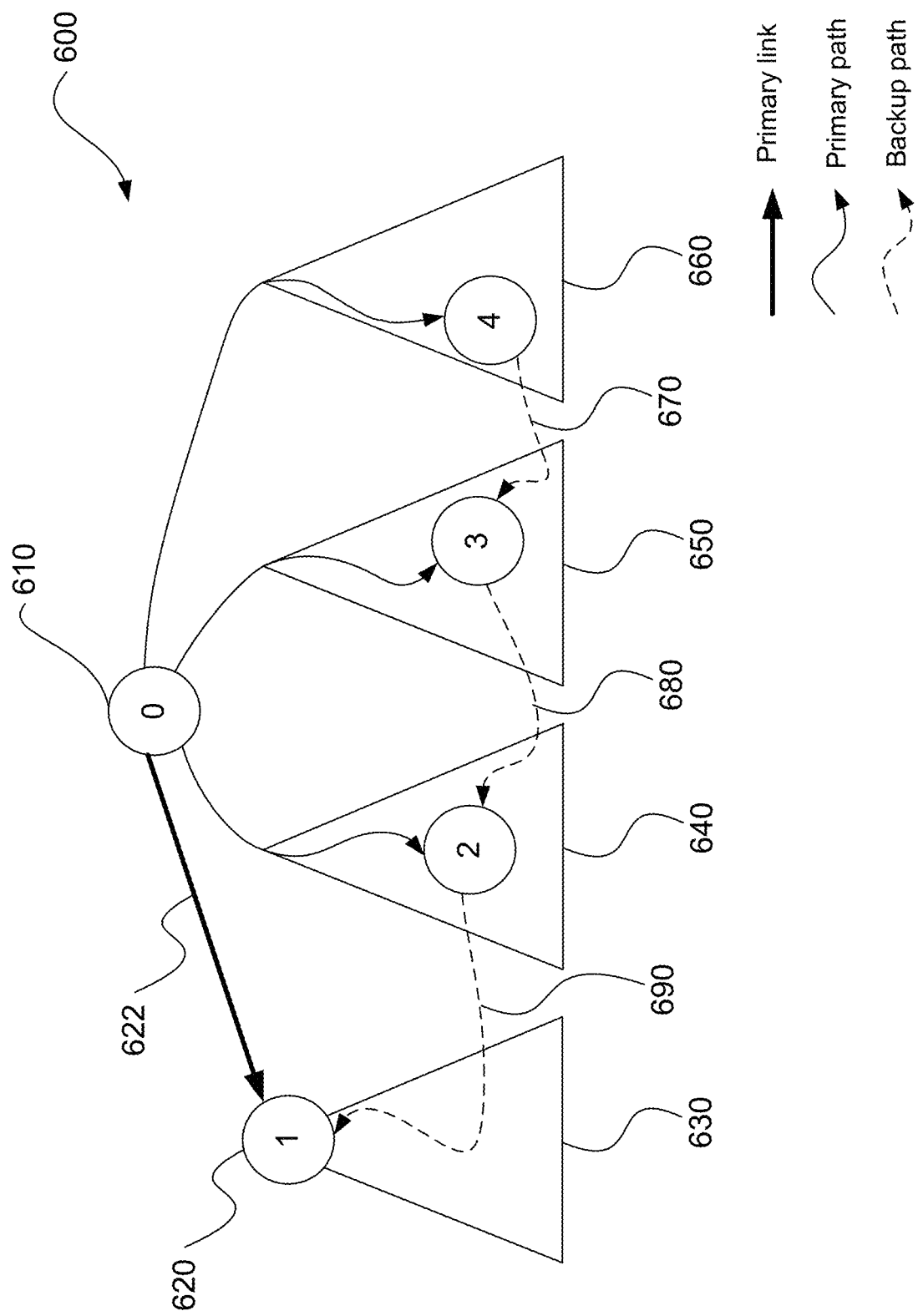
FIG. 6 shows an example backup spanning tree with a backup root node in accordance with aspects of the disclosure.

FIG. 5 is a block diagram showing an example backup spanning tree 500 in response to a node failure. The spanning tree 200 of FIG. 2 is reproduced in FIG. 5, with the primary links shown as solid arrows. FIG. 5 further shows as dotted lines where potential links may be formed, but was not formed in the primary spanning tree 200. When a node fails in the primary spanning tree 200, such as node 4 shown, the failed node 4 can no longer be used for clock synchronization. As such, the primary links 240, 242, 244 connecting node 4 to its descendants should be removed. Since root node 0 is an ancestor of node 4, the primary link 230 may or may not be removed. With primary links 240, 242, 244 removed, nodes 8, 9, 1, 5, and 2 are no longer connected to the root node 0, and thus have no way of receiving synchronization messages. Thus, at least one existing primary links should be reconfigured and/or at least one new links should be formed to reconnect nodes 8, 9, 1, 5 and 2 to the root node 0.

As shown, the backup spanning tree 500 includes both existing primary links of the primary spanning tree 200 that are reconfigured, as well as additional new links. For example, new backup link 510 is formed between nodes 6 and 1, which reconnects node 1 to the root node 0. New backup link 520 is formed between nodes 3 and 5, which reconnects node 5 to root node 0, and new backup link 530 is formed between nodes 5 and 9, which reconnects node 9 to root node 0. Further, to reconnect node 8 to root node 0, previously existing primary link 250, which pointed in the direction from node 8 to node 5 in the spanning tree 200, is reconfigured as backup link 540, which points in the direction from node 5 to node 8 in the backup spanning tree 500. In other words, node 6 is the backup parent of node 1, node 3 is the backup parent of node 5, and node 5 is the backup parent of nodes 8 and 9.

Like the link failure, it may also be noted here in FIG. 5 that, if a different node has failed in the primary spanning tree 200, then the backup spanning tree 500 may not be able to address that different node failure. For example, if node 6 fails instead of node 4, backup links 510, 520, 530, 540 would not be able to reconnect nodes 1, 10, 11, 7, and 3 to node 0, rather, different backup links for these nodes connecting them to different backup parent nodes. As such, the controller 310 may be configured to compute a backup parent node for each node in the primary spanning tree. For instance, the controller 310 may be configured to compute the backup parent nodes based on a second predetermined rule that the backup parent node cannot be an ancestor of the primary parent node. For example referring to FIG. 5, the backup parent node of node 5 is node 3, which is not an ancestor of its primary parent node 8. Otherwise, if the backup parent node of node 5 is node 4, which is an ancestor of its primary parent node 8, node 5 cannot be reconnected in the case if node 4 fails.

However, in the examples shown in FIGS. 4 and 5, the failure does not occur at the root node of the spanning tree. As such, links may be reconfigured to reconnect all the nodes to the root node using backup parent nodes. However, in some instances, the root node itself may fail, thus a backup spanning tree may additionally provide a backup root node. In this regard, FIG. 6 is a block diagram showing an example backup spanning tree having a backup root node.

Referring to FIG. 6, the primary spanning tree 600 is shown with primary links and primary paths, as well as backup paths. In this primary spanning tree 600, node 0 is the primary root node 610, and is connected to a number of subtrees 630, 640, 650, 660. For simplicity, only one node is shown in each of the subtrees 630, 640, 650, 660, each of which may actually include any number of nodes. Further as shown, one of the subtrees 630 includes a node 1 as the backup root node 620, which is directly connected to the primary root node 0 through primary link 622. As such, in case if primary root node 0 fails, controller 310 may reconfigure backup root node 1 as the root node for all other nodes. The controller 310 may do so according to a third predetermined rule that the backup root node 1 must be able to reach all other nodes through backup paths.

Additionally, the controller 310 may configure the primary spanning tree so that a failure in the primary root node 0 may be detected. The controller 310 may choose the backup root node according to a fourth predetermined rule that the backup root node is a direct child of the primary root node, and that a backup path can be formed indirectly connecting the backup root node to the primary root node. Thus as shown, the backup root node 1 is a child of the primary root node 0, and as such, may receive synchronization messages directly from the primary root node 0 through primary link 622. Further as shown, a backup path may be formed across different primary subtrees 640, 650, 660 through nodes 4, 3, 2 respectively such that, as long as the primary root node 0 is still working, the backup root node 1 may receive synchronization messages from the primary root node 0 through the backup paths 670, 680, 690 even if link 622 fails. However, in the event that primary root node 0 indeed fails, backup root node 1 may stop receiving synchronization message from the root node 0 through both the link 622 and the backup paths 670, 680, 690. Thus, assuming there are no multiple link failures, a failure of the primary root node 0 may be detected. In this regard, the backup root node 1 may detect failure in the primary root node 0 based on two timeouts, a first timeout after not receiving any synchronization message through primary link 622 after a first predetermined time period, and a second timeout after not receiving any synchronization message through backup paths 670, 680, 690 after a second predetermined time period. Once the root node failure is detected, controller 310 may then configure backup root node 1 as the new root node, and reconfigure links so that all other nodes are directly or indirectly connected to the new root node 1.

As mentioned above, the controller 310 may be configured to pre-compute at least one backup plan in advance of any failure. For instance, before any failure is detected in primary spanning tree 200, the controller 310 may pre-compute at least one backup plan for each of link failure, non-root node failure, and root node failure. Then, if a failure in the primary spanning tree is detected, for example reported by a node to the controller, the controller 310 may determine the type of failure, and select one of the backup plans based on the type of failure. Alternatively, the controller 310 may be configured to pre-compute at least one backup plan that is generic to multiple failures. The controller 310 may do so by determining backup parent nodes for each node in the primary spanning tree, and determining backup links that can connect each node to its backup parent nodes according to all four predetermined rules described above with reference to FIGS. 4-6.

Figure 7:
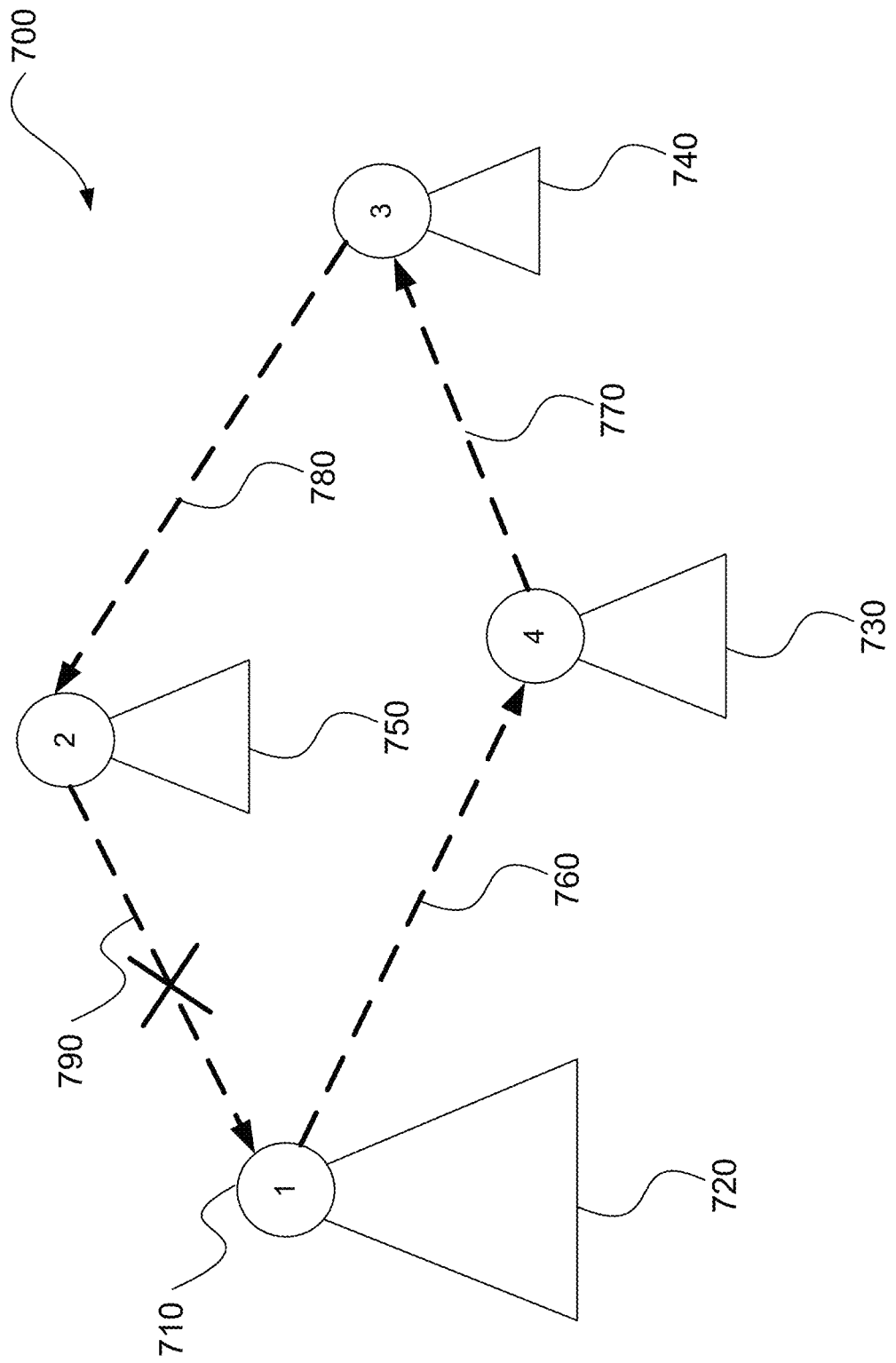
FIG. 7 shows an example backup spanning tree generic to multiple types of failure in accordance with aspects of the disclosure.

For instance, FIG. 7 is a block diagram showing an example backup spanning tree 700 that is generic to multiple types of failures. For instance, to satisfy the third predetermined rule, a loop can be formed in the backup spanning tree 700, which includes node 1 as the backup root node 710, and that each node 1, 2, 3, 4 in the loop has a backup subtree 720, 730, 740, 750. In the example shown, the loop is formed by links 760, 770, 780, and 790. To satisfy the first predetermined rule, the loop may be configured to cross more than one primary subtree (for example subtrees 630-660 of FIG. 6) rooted at the children of the primary root node (for example node 0 of FIG. 6) so that the loop is not under any single primary subtree as described with reference to FIG. 4. The fourth predetermined rule may be satisfied by having the loop cross as many primary subtrees as possible (for example subtrees 630-660 of FIG. 6) such that synchronization message from the primary root node (for example node 0 of FIG. 6) may be received through as many sources as possible. Further as shown, upon detection of a second timeout indicating failure of the primary root node, link 790 may be removed, thereby severing the loop and ensuring that the new primary spanning tree no longer has a loop. Finally, though not shown in FIG. 7, the second predetermined rule may be satisfied by requiring that no backup link of a given node is formed from a primary ancestor of that given node, as described with reference to FIG. 5. By pre-computing a generic backup spanning tree, instead of pre-computing backup spanning trees for specific types of failures, clock synchronization may be performed according to the generic backup plan as soon as possible, without needing extra time to determine the type of failure and selecting a backup plan based on the type of failure.

Thus according to the examples described with reference to FIGS. 4-7, the controller 310 may be configured to pre-compute at least one backup plan including a backup spanning tree in advance of any failure. For instance, a first backup plan may be computed at the same time or soon after the primary spanning tree is configured. Thereafter, an additional backup plan may be pre-computed. For example, a new backup plan may be pre-computed each time the spanning tree is being reconfigured according to a previous backup plan. As another example, a new backup plan may be computed periodically, such as at each predetermined time interval so that the system may readily have at least one backup plans for clock synchronization.

Figure 8A:
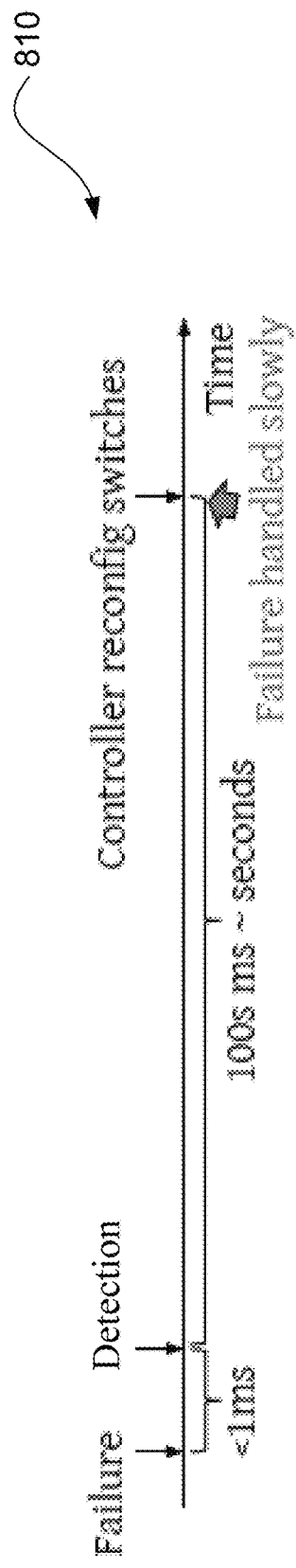
FIGS. 8A and 8B show example timelines for failure detection and handling in two clock synchronization systems in accordance with aspects of the disclosure.
Figure 8B:
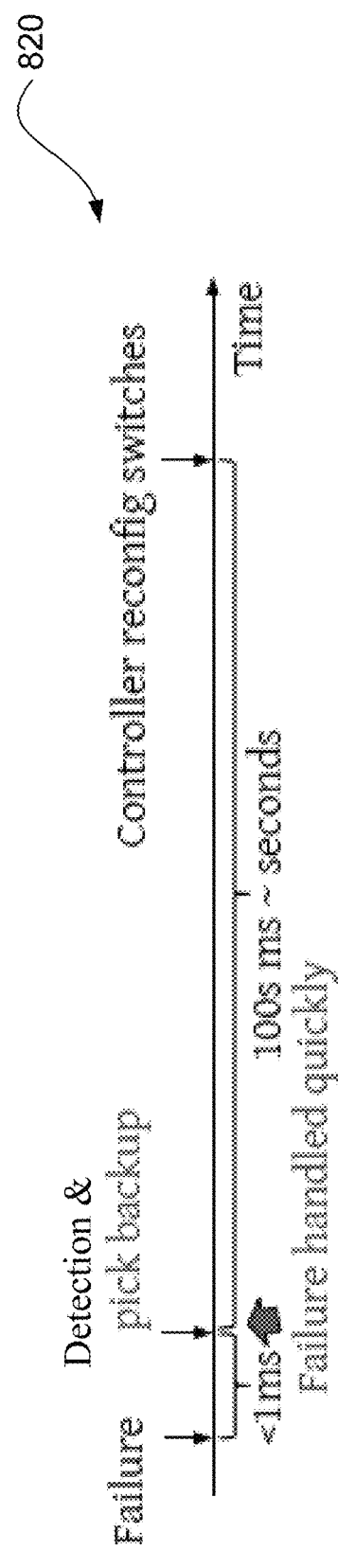

FIGS. 8A and 8B show example timelines for failure detection and handling in two clock synchronization systems. Referring to FIG. 8A, the first timeline 810 may represent failure detection and handling times for a clock synchronization system that does not pre-compute backup plans. As such, once a failure occurs, it may take some time before the failure is detected by a device, which may be <1 ms as shown. Once the failure is detected, it may take another hundreds of ms up to a few seconds to compute a backup spanning tree, and reconfigure the devices and links according to the backup spanning tree. As such, the entire failure detection and handling process may take up to a few seconds. In contrast, referring to FIG. 8B, the second timeline 820 may represent failure detection and handing times for a clock synchronization system that pre-computes backup plans before any failure is detected. As shown, upon failure detection at <1 ms, the failure may be locally repaired by using the pre-computed backup links to backup parent nodes, this local repair thus happens much earlier compared to the computing of a backup spanning tree in FIG. 8A. Once the failure is locally repaired, one or more new backup spanning trees may be pre-computed in anticipation for the next failure, which may take hundreds of ms up to a few seconds.

In addition to pre-computing of backup plans and detection of root node failures, the clock synchronization system may be further configured to detect byzantine failures. FIGS. 9A and 9B illustrate detections of byzantine failures using a portion of the spanning tree 200 of FIG. 2. As shown, node 2 may be configured with primary parent node 5, and also a backup parent node 7. As such, while operating according to the primary spanning tree 200, node 2 may receive a synchronization message from parent node 5. To perform clock synchronization, node 2 may then compare a recent value of its local clock $t\_2$ with a timestamp $t\_5$ in the synchronization message. If a mismatch between $t\_2$ and $t\_5$ is large, for example meeting a predetermined threshold, node 2 may detect that a failure has occurred. Upon detection of this failure, node 2 may be reconfigured to synchronize with backup parent node 7. For instance, node 2 may report the failure detection to the controller 310, and the controller 310 may reconfigure the nodes based on the pre-computed backup spanning tree.

At this point, node 2 may still not know whether the failure was due to error in its own local clock or error in a local clock at node 5. However, sometime later when node 2 receives a synchronization message after the reconfiguration from the backup parent node 7, node 2 may then determine which clock has failed. To do so, node 2 may further compare another recent value of its local clock value $t\_2'$ with a timestamp $t\_7$ in the synchronization message from node 7. For instance as shown in FIG. 9A, if a mismatch between $t\_2'$ and $t\_7$ is also large, for example meeting the predetermined threshold, node 2 may determine that its own local clock has failed. In contrast as shown in FIG. 9B, if the mismatch between $t\_2'$ and $t\_7$ is small, for example not meeting the predetermined threshold, node 2 may determine that the local clock of primary parent node 5 has failed. Thus, during the time period between the first synchronization message and the second synchronization message, node 2 may not know which clock has failed. To fully avoid impact of byzantine failures, hardware redundancy may be required failures, where each node is provided with multiple local clocks and multiple oscillators.

Figure 10:
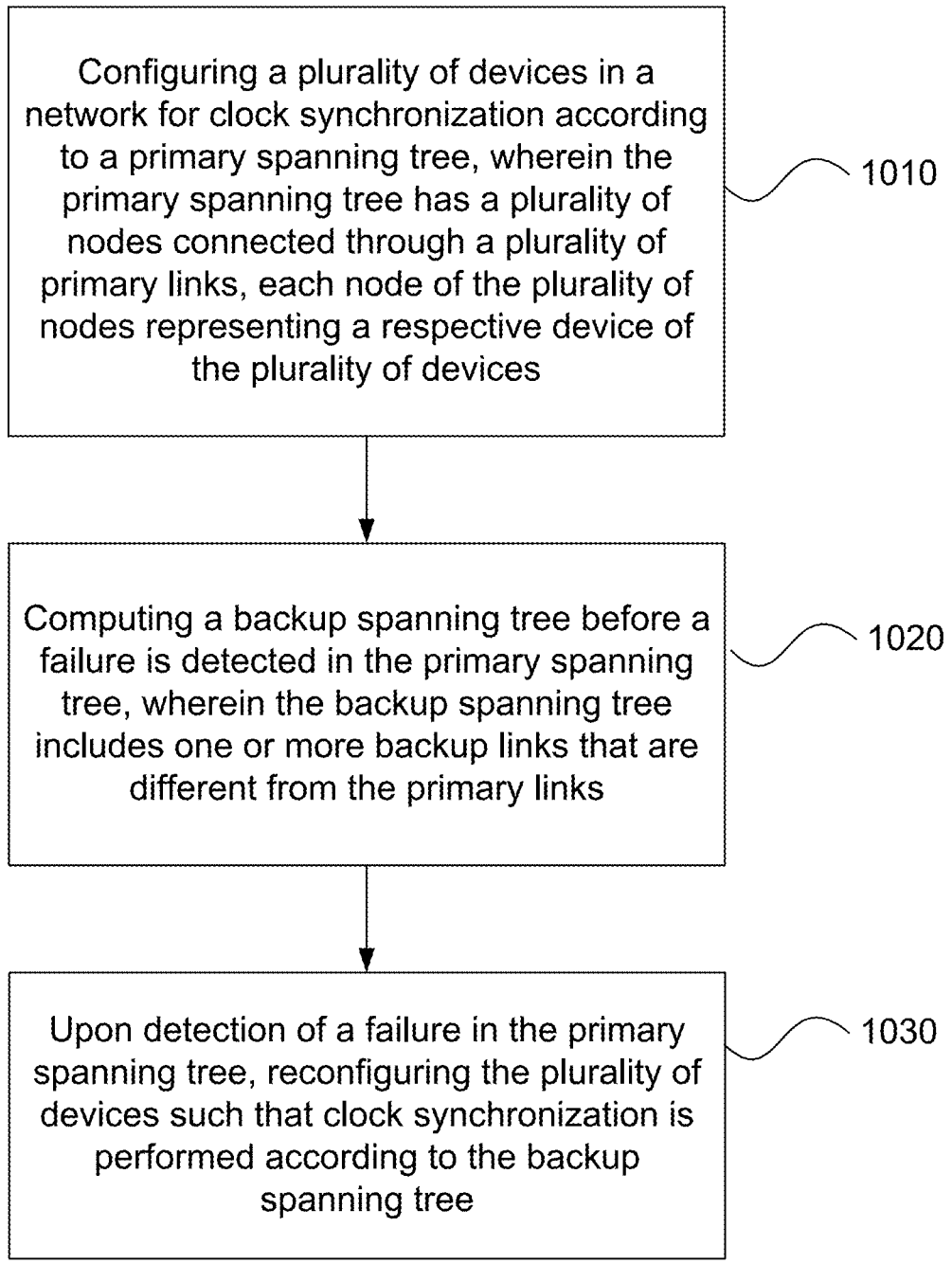
FIG. 10 is an example flow diagram showing an example method in accordance with aspects of the disclosure.

FIG. 10 is a flow diagram 1000 illustrating an example method in accordance with aspects of the disclosure. The method may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted. Although FIG. 1000 illustrates one example method, variations of the methods may be performed, for instance as described above with reference to FIGS. 1-9. The flow diagram 1000 may be performed by one or more processors, such as the one or more processors running the controller 310. The one or more processors may receive data, make determinations based on the data, and configure and/or reconfigure components as described above with reference to FIGS. 1-9.

Referring to FIG. 10, at block 1010, a plurality of devices in a network are configured for clock synchronization according to a primary spanning tree. The primary spanning tree has a plurality of nodes connected through a plurality of primary links, where each node of the plurality of nodes represents a respective device of the plurality of devices. An example primary spanning tree may be the spanning tree 200 shown in FIG. 2. As described above, the primary spanning tree may include a root node and non-root nodes. Each non-root node may be connected to the root node via a primary path that includes one or more primary links.

At block 1020, a backup spanning tree is computed before a failure is detected in the primary spanning tree. The backup spanning tree includes one or more backup links that are different from the primary links. For instance, FIG. 4 shows an example backup spanning tree in response to link failure in the primary spanning tree 200 of FIG. 2, FIG. 5 shows an example backup spanning tree in response to a device failure in the primary spanning tree 200 of FIG. 2, and FIG. 6 shows an example backup spanning tree in response to a root node failure in the primary spanning tree 200 of FIG. 2. As another example, FIG. 7 shows an example backup spanning tree that can be used generically in response to multiple types of failures.

At block 1030, upon detection of a failure, the plurality of devices are reconfigured such that clock synchronization is performed according to the backup spanning tree. For instance, as shown and described with reference to FIGS. 4-7, the reconfiguring may include adding new links, removing existing links, using alternative links to send synchronization messages, or changing direction of the synchronization messages. Further as shown and described with reference to FIG. 6, detection of primary root failures may be based on determining whether synchronization messages can be received by a backup root node from the primary root node through multiple paths. Also as shown and described with reference to FIGS. 9A-9B, detection of byzantine failures may be based on comparison of synchronization messages from both primary and backup parents.

The technology is advantageous in a number of ways. For instance, by pre-computing backup plans in advance of any failure, valuable time may be saved once a failure is detected, since the clock synchronization may immediately use the precomputed backup plan to reduce the worst-case time bound. Further, clock synchronization may be performed according to a generic backup plan as soon as possible, without needing extra time to determine the type of failure and selecting a backup plan based on the type of failure, which may further reduce the worst-case time bound. Still further, the clock synchronization systems provide efficient detection mechanisms for root failures and byzantine failures by incorporating them into the process for reconfiguring the backup spanning tree. Accordingly, the improved failure detection and handling mechanisms may generate more reliable and consistent timestamps for many applications. For instance, better consistency protocols and consistency snapshots of distributed database or storage may be possible, such as a shorter commit time for transactions and ordered delivery of packets. As another example, precise timing information may enable one-way delay telemetry measurements for congestion control and traffic management. As still another example, better synchronized clocks may significantly improve accuracy of system debugging using logs generated by multiple devices.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
   configuring, by one or more processors, a plurality of devices in a network for clock synchronization according to a primary spanning tree, wherein the primary spanning tree has a plurality of nodes connected through a plurality of primary links, each node of the plurality of nodes representing a respective device of the plurality of devices;
   computing, by the one or more processors, a backup spanning tree before a failure is detected in the primary spanning tree, wherein the backup spanning tree includes one or more backup links that are different from the primary links, wherein the backup spanning tree further includes a loop of nodes, each node in the loop having a backup subtree; and upon detection of a failure in the primary spanning tree, reconfiguring, by the one or more processors, the plurality of devices such that clock synchronization is performed according to the backup spanning tree.

2. The method of claim 1, further comprising:
upon detection of the failure in the primary spanning tree, computing a second backup spanning tree, wherein the second backup spanning tree includes one or more second backup links that are different from the backup links.

3. The method of claim 1, further comprising:
periodically computing, by the one or more processors, additional backup spanning trees, wherein the additional backup spanning trees include one or more additional backup links that are different from the backup links.

4. The method of claim 1, wherein the primary spanning tree includes a primary root node and the backup spanning tree includes a backup root node that is a child of the primary root node, and wherein the primary links connect all non-root nodes of the primary spanning tree to the primary root node and the backup links connect all non-root nodes of the backup spanning tree to the backup root node.

5. The method of claim 1, wherein the primary spanning trees comprise one or more primary subtrees, and the backup links do not form any loops within any of the primary subtrees.

6. The method of claim 1, wherein in the backup spanning tree, a backup parent node of any given node is not an ancestor of the given node.

7. The method of claim 4, wherein the loop connects the backup root node to a plurality of nodes each having a backup subtree.

8. The method of claim 7, further comprising:
configuring, by the one or more processors, the backup root node to receive synchronization messages from the primary root node through the loop when synchronization messages are not received directly from the primary root for a first predetermined time period.

9. The method of claim 8, further comprising:
detecting, by the one or more processors based on not receiving synchronization messages through the loop for a second predetermined time period, a failure in the primary root node;
configuring, by the one or more processors, the backup root node to replace the primary root node.

10. The method of claim 1, further comprising:
receiving, at a given node, a first synchronization message from a primary parent node of the given node;
detecting, based on a mismatch between a first timestamp in the first synchronization message and a first local clock value of the given node meeting a predetermined threshold, a byzantine failure;
after being reconfigured according to the backup spanning tree, receiving, at the given node, a second synchronization message from a backup parent node of the given node;
detecting, based on a mismatch between a second timestamp in the second synchronization message and a second local clock value of the given node meeting the predetermined threshold, that the byzantine failure occurred at the given node.

11. The method of claim 1, further comprising:
receiving, at a given node, a first synchronization message from a primary parent node of the given node;
detecting, based on a mismatch between a first timestamp in the first synchronization message and a first local clock value of the given node meeting a predetermined threshold, a byzantine failure;
after being reconfigured according to the backup spanning tree, receiving, at the given node, a second synchronization message from a backup parent node of the given node; and
detecting, based on a mismatch between a second timestamp in the second synchronization message and a second local clock value of the given node not meeting the predetermined threshold, that the byzantine failure occurred at the primary parent node.

12. The method of claim 1, further comprising:
providing timestamps from synchronized clocks to one or more applications;
using the timestamps to order delivery of packets between the one or more applications.

13. The method of claim 1, further comprising:
providing timestamps from synchronized clocks to at least one telemetry or congestion control applications for measuring one-way delay in the network.

14. A system, comprising:
one or more processors configured to:
configure a plurality of devices in a network for clock synchronization according to a primary spanning tree, wherein the primary spanning tree has a plurality of nodes connected through a plurality of primary links, each node of the plurality of nodes representing a respective device of the plurality of devices;
compute a backup spanning tree before a failure is detected in the primary spanning tree, wherein the backup spanning tree includes one or more backup links that are different from the primary links, wherein the backup spanning tree further includes a loop of nodes, each node in the loop having a backup subtree; and
upon detection of a failure in the primary spanning tree, reconfigure the plurality of devices such that clock synchronization is performed according to the backup spanning tree.

15. The system of claim 14, further comprising:
the plurality of devices, the plurality of devices each having a respective local clock.

16. The system of claim 14, further comprising:
a plurality of computing devices in a distributed computing environment, each of the plurality of computing devices having a respective network interface card (NIC).

17. The system of claim 16, wherein the plurality of computing devices are configured to provide one or more cloud services, and the NICs are configured to provide direct access of timestamps from the synchronized clocks to the one or more cloud services.

18. The system of claim 14, wherein the primary spanning tree includes a primary root node and the backup spanning tree includes a backup root node that is a child of the primary root node, and wherein the primary links connect all non-root nodes of the primary spanning tree to the primary root node and the backup links connect all non-root nodes of the backup spanning tree to the backup root node.

19. The system of claim 18, wherein the loop connects the backup root node to a plurality of nodes each having a backup subtree.

20. A non-transitory computer-readable storage medium storing instructions executable by one or more processors for performing a method, comprising:

configuring a plurality of devices in a network for clock synchronization according to a primary spanning tree, wherein the primary spanning tree has a plurality of nodes connected through a plurality of primary links, each node of the plurality of nodes representing a respective device of the plurality of devices;

computing a backup spanning tree before a failure is detected in the primary spanning tree, wherein the backup spanning tree includes one or more backup links that are different from the primary links, wherein the backup spanning tree further includes a loop of nodes, each node in the loop having a backup subtree; and upon detection of a failure in the primary spanning tree, reconfiguring the plurality of devices such that clock synchronization is performed according to the backup spanning tree.

* * * * *